United States Patent
Trimberger (10) Patent No.: US 9,082,514 B1
(45) Date of Patent: Jul. 14, 2015

(54) METHOD AND APPARATUS FOR PHYSICALLY UNCLONABLE FUNCTION BURN-IN

(71) Applicant: Xilinx, Inc., San Jose, CA (US)

(72) Inventor: Stephen M. Trimberger, Incline Village, NV (US)

(73) Assignee: XILINX, INC., San Jose, CA (US)

( * ) Notice: Subject to any disclaimer, the term of this patent is extended or adjusted under 35 U.S.C. 154(b) by 264 days.

(21) Appl. No.: 13/867,456

(22) Filed: Apr. 22, 2013

(51) Int. Cl.
*H03K 19/003* (2006.01)
*G11C 29/52* (2006.01)
*H04L 9/32* (2006.01)

(52) U.S. Cl.
CPC .............. *G11C 29/52* (2013.01); *H03K 19/003* (2013.01); *H04L 9/3278* (2013.01)

(58) Field of Classification Search
CPC ..... H03K 19/003; H04L 9/3278; G06F 21/73
USPC .................................................. 326/8, 38–41
See application file for complete search history.

(56) References Cited

U.S. PATENT DOCUMENTS

| | | | |
|---|---|---|---|
| 6,313,511 | B1 | 11/2001 | Noguchi |
| 8,290,150 | B2 | 10/2012 | Erhart et al. |
| 8,782,396 | B2 * | 7/2014 | Ziola et al. ............ 713/155 |
| 2003/0034848 | A1 | 2/2003 | Norman et al. |
| 2007/0081575 | A1 | 4/2007 | Liu et al. |
| 2008/0111638 | A1 | 5/2008 | Thaller |
| 2009/0288092 | A1 | 11/2009 | Yamaoka |
| 2011/0191602 | A1 | 8/2011 | Bearden et al. |
| 2011/0196628 | A1 | 8/2011 | Osada |
| 2011/0210798 | A1 | 9/2011 | Koh et al. |
| 2012/0179952 | A1 | 7/2012 | Tuyls et al. |
| 2012/0182054 | A1 | 7/2012 | Sabapathy et al. |
| 2012/0197570 | A1 | 8/2012 | Ramezani et al. |
| 2012/0286887 | A1 | 11/2012 | Chang |
| 2013/0047209 | A1 | 2/2013 | Satoh et al. |
| 2013/0058384 | A1 | 3/2013 | Otis et al. |
| 2013/0106461 | A1 | 5/2013 | Ficke et al. |
| 2013/0141137 | A1 | 6/2013 | Krutzik et al. |
| 2013/0234771 | A1 * | 9/2013 | Simons et al. ............ 327/215 |
| 2014/0225639 | A1 * | 8/2014 | Guo et al. ............ 326/8 |

OTHER PUBLICATIONS

U.S. Appl. No. 13/867,429, filed Apr. 22, 2013, Trimberger et al.
U.S. Appl. No. 13/867,574, filed Apr. 22, 2013, Trimberger et al.
Bayon, Pierre et al., "Contactless Electromagnetic Active Attack on Ring Oscillator Based True Random Number Generator," *Proc. of the Third International Workshop on Constructive Side-Channel Analysis and Secure Design* (*CODADE 2012*) May 21, 2012, 16 pages.

(Continued)

*Primary Examiner* — Don Le
(74) *Attorney, Agent, or Firm* — Kin-Wah Tong (57) ABSTRACT

A method, non-transitory computer readable medium, and apparatus for performing physically unclonable function (PUF) burn-in are disclosed. For example, the method identifies, by a processor, a natural output of an integrated circuit before the integrated circuit is initialized, identifies, by the processor, a physical characteristic of the integrated circuit associated with the physically unclonable function, and ages, by the processor, the physical characteristic of the integrated circuit to burn-in the natural output of the integrated circuit.

20 Claims, 4 Drawing Sheets

(56) References Cited

OTHER PUBLICATIONS

Handschuh, Helena et al., "Hardware Intrinsic Security from Physically Unclonable Functions," *Towards Hardware-Intrinsic Security*, Nov. 3, 2010, pp. 39-53, Springer-Verlag Berlin, Heidelberg, Germany.

Maes, Roel et al., "Physically Unclonable Functions: a Study on the State of the Art and Future Research Directions," in *Towards Hardware-Intrinsic Security: Foundations and Practice (Information Security and Cryptography)* Sedeghi et al., Nov. 3, 2010, pp. 1-36, Springer, USA.

Maiti, Abhranil et al., "Improved Ring Oscillator PUF: An FPGA-friendly Secure Primitive," *J, Cryptology*, Oct. 14, 2010, pp. 375-397, vol. 24, No. 2.

Meguerdichian, Saro et al., "Device Aging-Based Physically Unclonable Functions," *Proc. of the 48th Annual Design Automation Conference*, Jun. 5, 2011, pp. 288-289, ACM, New York, NY, USA.

Morozov, Sergey, "A Comparative Analysis of Delay Based PUF Implementations on FPGA," *IACR Cryptology ePrint Archive*, Dec. 19, 2009, pp. 1-13, International Association for Cryptologic Research (IACR), <http://www.iacr.org>.

Suh, G. Edward et al., "Physical Unclonable Functions for Device Authentication and Secret Key Generation," *Proc. of the 44th Annual Design Automation Conference*, Jun. 4, 2007, pp. 9-14, ACM, New York, NY, USA.

Virginia Tech, *Background on Physical Unclonable Functions (PIFs)*, downloaded Feb. 15, 2013, pp. 1-3, < http://rijndael.ece.vt.edu/puf/background.html>, Virginia Tech Department of Electrical and Computer Engineering, Blacksburg, Virginia, USA.

Xilinx, *Negative-Bias Temperature Instability (NTBI) Effects in 90 nm PMOS*, WP224 (v1.1), Nov. 21, 2005, pp. 1-4, Xilinx, Inc., San Jose, California, USA.

\* cited by examiner

METHOD AND APPARATUS FOR PHYSICALLY UNCLONABLE FUNCTION BURN-IN

TECHNICAL FIELD

The present disclosure relates generally to integrated circuits and, more particularly, to a method and apparatus for physically unclonable function burn-in.

BACKGROUND

Physically unclonable functions (PUF) are identifiers on integrated circuits ("chips") that result from process variation. Although these process variations may be undesirable for manufacturing, these process variations create a unique "fingerprint" for each chip. By being able to identify a chip, security protocols can be built using the chip's "fingerprint".

However, the problem with PUFs is that the PUF can vary over time. For certain functions such as identification functions, it may be acceptable if less than 100% of the bits in the PUF match. However, for other functions such as decryption functions, it is important that none of the bits change over time.

Some methods have tried to address this issue using "helper data". However, the "helper data" must be stored somewhere, which may add to the overhead. In addition, there is concern that the "helper data" might leak information about the decryption key.

SUMMARY

The present disclosure provides a method for performing physically unclonable function (PUF) burn-in. For example, the method identifies, by a processor, a natural output of an integrated circuit before the integrated circuit is initialized; identifies, by the processor, a physical characteristic of the integrated circuit associated with the physically unclonable function; and ages, by the processor, the physical characteristic of the integrated circuit to burn-in the natural output of the integrated circuit.

In various embodiments, one or more of the following may be true: the aging comprises using at least one of: a negative bias temperature instability process, a positive bias temperature instability process, a hot carrier injection process or an electromigration process; a time period required to complete the aging is a function of at least one of: a voltage or a temperature; the integrated circuit comprises at least one of: a static random-access memory, an arbiter delay circuit, a ring oscillator circuit, a latch cell, or a butterfly cell; the physical characteristic comprises one or more transistors used to store a value for the static random-access memory; the aging for the static random-access memory comprises: setting, by the processor, the stored value to be opposite of the natural output of the static random-access memory, and holding, by the processor, a position of one or more transistors of the static random-access memory to maintain the stored value to be opposite of the natural output for a time period; the physical characteristic comprises a delay path for the arbiter delay circuit; the aging for the arbiter delay circuit comprises: increasing, by the processor, a delay of a path that is deemed to be a slowest path; the physical characteristic comprises a frequency for the ring oscillator circuit; and/or the aging is repeated for each integrated circuit associated with each bit of the static random-access memory.

The present disclosure also provides a non-transitory computer-readable medium for performing physically unclonable function (PUF) burn-in. For example, a non-transitory computer-readable medium storing a plurality of instructions which, when executed by a processor, cause the processor to perform operations for performing physically unclonable function burn-in, the operations comprising: identifying a natural output of an integrated circuit before the integrated circuit is initialized; identifying a physical characteristic of the integrated circuit associated with the physically unclonable function; and aging the physical characteristic of the integrated circuit to burn-in the natural output of the integrated circuit.

The present disclosure also provides an apparatus for performing physically unclonable function (PUF) burn-in. For example, an apparatus for performing physically unclonable function burn-in, comprises: a processor, and a computer-readable medium storing a plurality of instructions that, when executed by the processor, cause the processor to perform operations, the operations comprising: identifying a natural output of an integrated circuit before the integrated circuit is initialized; identifying a physical characteristic of the integrated circuit associated with the physically unclonable function; and aging the physical characteristic of the integrated circuit to burn-in the natural output of the integrated circuit.

BRIEF DESCRIPTION OF THE DRAWINGS

Accompanying drawings show circuits and methods in accordance with one or more aspects of the invention. However, the accompanying drawings should not be taken to limit the invention to the examples shown, but are for explanation and understanding only.

FIG. 3 illustrates an example flowchart of a method for performing physically unclonable function burn-in.

To facilitate understanding, identical reference numerals have been used, where possible, to designate identical elements that are common to the figures.

DETAILED DESCRIPTION

The present disclosure broadly discloses a method, non-transitory computer readable medium, and apparatus for performing physically unclonable function burn-in. As discussed above, each integrated circuit chip can have a unique "fingerprint". By being able to identify a chip, security protocols can be built using the chip's "fingerprint". The problem with PUFs is that the PUF can vary over time. However, for encryption and decryption purposes 100% of the bits in the PUF must match at all times during the life of the semiconductor chip.

Some methods have tried to address this issue using "helper data," which may take the form of an error correcting code for the PUF value. However, the "helper data" must be stored somewhere, which may add to the memory overhead. In addition, there is concern that the "helper data" might leak information about the decryption key.

The present disclosure resolves these issues by providing a method and apparatus for performing physically unclonable function burn-in. For example, the components within the integrated circuit (e.g., transistors, individual circuit paths, etc.) of a semiconductor chip (e.g., a memory chip, a complementary metal-oxide semiconductor (CMOS) chip, and the like) are intentionally aged such that the "fingerprint" is burned in. In other words, a physical characteristic of the integrated circuit is exploited to ensure that a natural output of the integrated circuit is repeated. For example, a "weaker" portion of the semiconductor chip is intentionally aged to further "weaken" this portion of the semiconductor chip to ensure that a natural output is burned-in.

This may be repeated for each integrated circuit representing a bit of the semiconductor chip to ensure that the natural output of the semiconductor chip is ensured. For example, a memory may have four bits that have natural output values of 1010 before the memory is initialized. The integrated circuit associated with each one of the four bits is intentionally aged to ensure that the memory cell will always output the value of 1010.

The approach of intentional aging may be further extended such that a semiconductor chip is forced to store any desired value. For example, a semiconductor chip is intentionally aged to become a non-volatile memory cell using the aging process.

Figure 1:
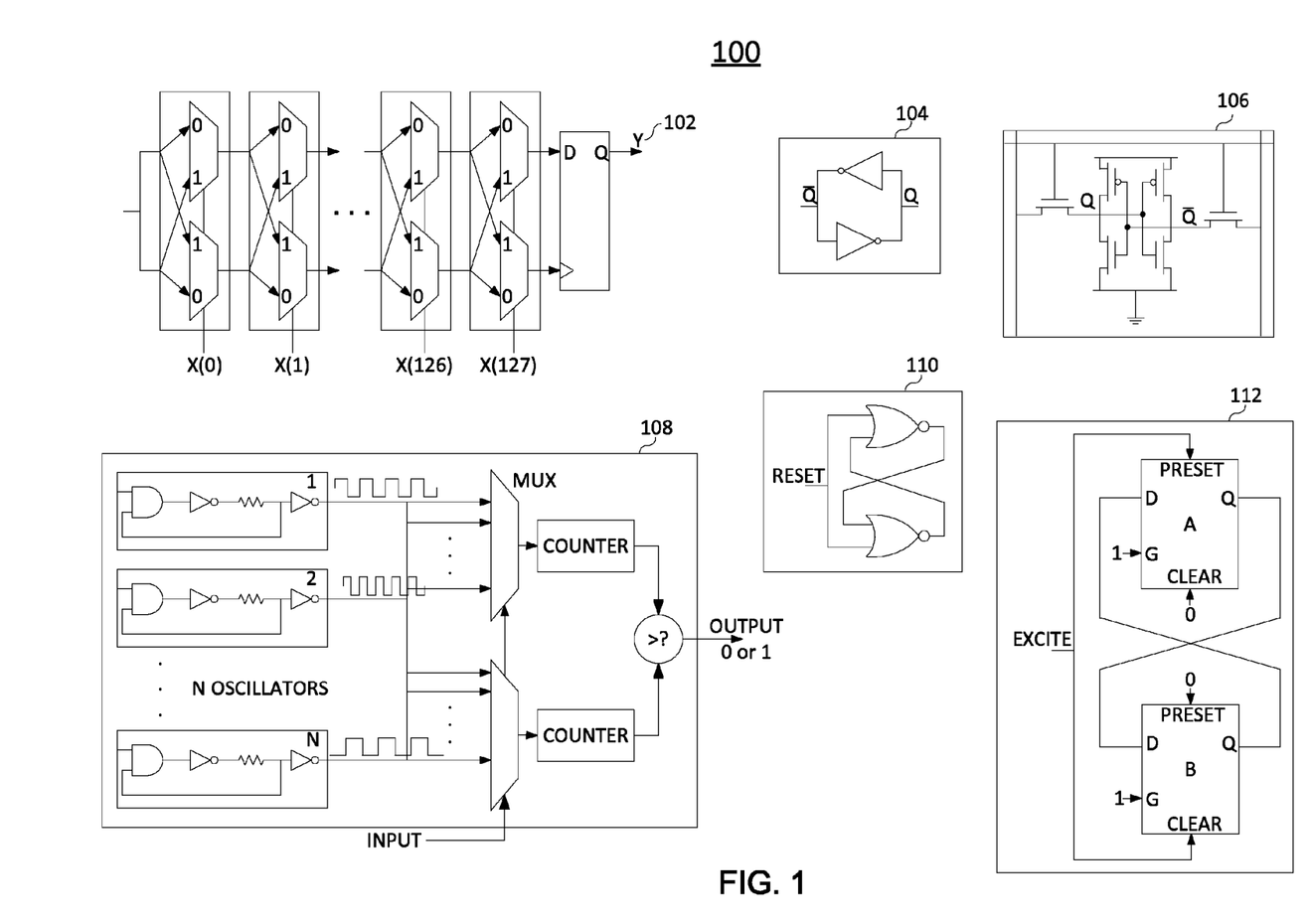
FIG. 1 illustrates examples of integrated circuits that have physically unclonable functions (PUFs)

FIG. 1 illustrates examples of different types of integrated circuits that have PUFs. The integrated circuit may comprise an arbiter delay circuit 102. The arbiter delay circuit 102 creates two delay paths with the same layout length for each input and produces an output based on which path is faster.

The integrated circuit may comprise a static random access memory (SRAM) 106. FIG. 1 also illustrates an illustrative logical circuit 104 of the SRAM 106. In other examples, the integrated circuit may comprise a ring oscillator based circuit 108, a latch cell 110, a butterfly cell 112, and the like. Although several examples of integrated circuits that can be used as PUFs are illustrated in FIG. 1, it should be noted that the aging process may be applied to any type of integrated circuit or semiconductor chip.

As discussed above, any one of the integrated circuits illustrated in FIG. 1 is aged to burn in a natural output of the integrated circuit. A natural output is a signal generated by the integrated circuit when unbiased by noise or external signals. A memory may store a natural value when it is powered-up, but not written to any specific value. An oscillator may have a natural frequency of oscillation. Each one of the integrated circuits illustrated in FIG. 1 may have different physical characteristics associated with the PUF of that integrated circuit that is aged. For example, the arbiter delay circuit 102 has a physical characteristic of delay in each of the paths that is exploited to age the integrated circuit. In another example, the SRAM 106 has a physical characteristic of one or more transistors used to store a value that is exploited to age the integrated circuit. In another example, the ring oscillator based circuit 108 has a physical characteristic of a frequency that is exploited to age the integrated circuit.

Various aging effects may be applied to the physical characteristic of the integrated circuit to age or change the physical characteristic. Negative bias temperature instability (NBTI) may be applied. NBTI provides prolonged negative bias on transistors that may cause a threshold voltage to shift. NBTI may be used to affect P-channel transistors.

Positive bias temperature instability (PBTI) may be applied. PBTI provides prolonged positive bias on transistors that may cause a threshold voltage to shift. PBTI may be used to affect N-channel transistors.

Hot carrier injection (HCI) may be applied. In HCI, a charge is trapped in the gate region of a transistor, thereby changing the effective threshold.

Electromigration may be applied. In electromigration, high current through metal lines causes them to thin, thereby increasing resistance. Although four aging effects are described above, it should be noted that any aging effect may be applied that can be used to manipulate or emphasize a physical characteristic of the integrated circuit.

The aging effect is applied for a time period sufficient to manipulate or emphasize the physical characteristic of the integrated circuit until the natural outcome is burned into the integrated circuit. For example, the aging effect is applied to the integrated circuit for approximately one minute or more.

The amount of time the aging effect is applied may be a function of environmental parameters, e.g., a voltage and/or a temperature. For example, the aging effect is accelerated if the voltage is increased or if the temperature is increased.

Figure 2:
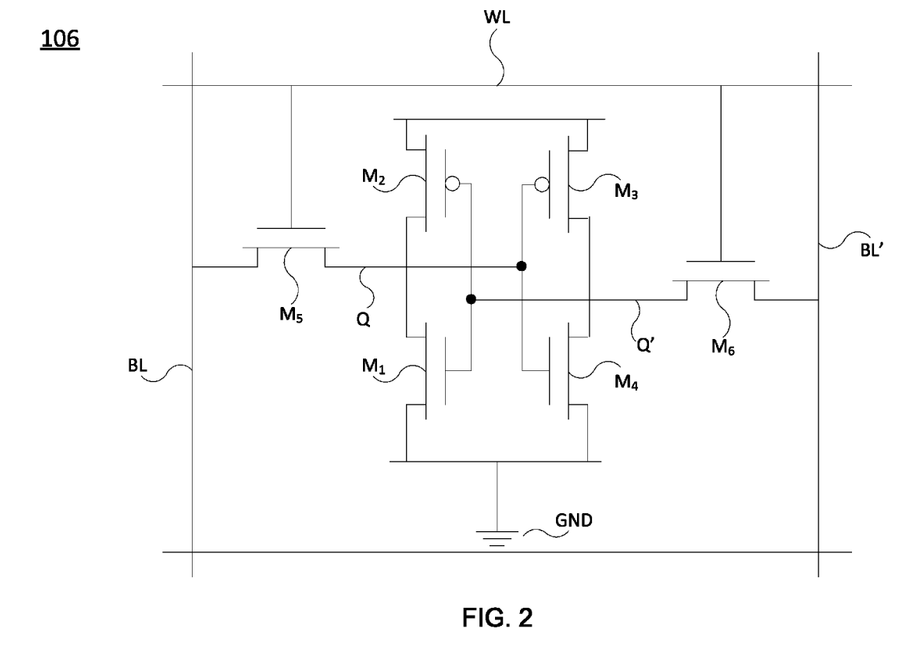
FIG. 2 illustrates one example of a static random access memory (SRAM) PUF.

FIG. 2 illustrates a more detailed view of the SRAM 106 to provide a more detailed explanation of one example of how an integrated circuit is intentionally aged. The SRAM 106 includes bit lines BL' and BL and a word line WL. The SRAM 106 includes stored values Q' and Q. The SRAM 106 includes transistors $M_1$-$M_6$. Some of the transistors, e.g., $M_1$ and $M_4$, are referred to as pull down transistors and some of the transistors, e.g., $M_2$ and $M_3$, are referred to as pull up transistors.

Ideally, the pullup transistors $M_2$ and $M_3$ should be identical P-channel devices and pulldown transistors $M_1$ and $M_4$ should be identical N-channel devices. Access transistors $M_5$ and $M_6$ should also be identical and the layout of the memory cell should balance capacitances on the Q ad Q' nodes. However, in actuality each transistor $M_1$-$M_6$ varies slightly due to uncontrollable factors during the manufacturing process, such as for example, dopant concentrations. Variations in the relative threshold voltages of the transistors $M_1$-$M_6$ cause each cell to tend toward a natural value of 1 or 0 when power is applied initially. The more closely matched the threshold voltages are, the more influence noise or external signals will have over the natural output, possibly causing the bit of the SRAM 106 to flip. By aging the "weaker" transistors, the threshold voltage may be moved in a desired direction to guarantee that the natural output is maintained over time. In other words, intentionally aging the "weaker" transistors ensure that the bit of the SRAM 106 will not flip due to noise or external signals over time.

Before the SRAM 106 is initialized, a natural output of the SRAM 106 is read. For example, the SRAM 106 has a natural output of Q=0. Thus, by aging the SRAM 106 the natural output of Q=0 can be reinforced. The SRAM 106 is aged by setting the value of Q to Q=1. This can be performed by writing a 1 into the memory cell by asserting the word line WL high with BL=1 and BL'=0, thus, setting Q=1 and Q'=0. WL may then be reset to WL=0 if desired. Q=1 turns on pulldown transistor $M_4$ and turns off pullup transistor $M_3$. Q'=0 turns off pulldown transistor $M_1$ and turns on pullup transistors $M_2$. By activating transistors M2 and $M_4$ and allowing current to flow through them, the transistors $M_2$ and $M_4$ are weakened to ensure that the natural output of Q=0 is always the output Q. In another aging process, holding the value of Q'=0 on the gate of transistor $M_2$ causes NBTI aging regardless of current and weakening of the transistor $M_2$. In other words, the threshold voltage for $M_2$ is increased using the aging effects such that random variations or noise or external signals will not bring about the threshold voltage for Q=1 and cause the bit of the SRAM 106 to flip to 1 from a natural output of Q=0.

The aging may be performed using any of the aging effects described above, e.g., NBTI, PBTI, HCl or electromigration. The aging effect may be applied, for example, for at least one minute. The aging effect can be accelerated (i.e., decreasing an amount of time required to age the transistors) by increasing the voltage or temperature.

Although the SRAM 106 is provided as an example, it should be noted that any of the integrated circuits illustrated in FIG. 1 may be aged in a similar fashion. For example, electromigration is applied to selected paths in the arbiter delay circuit 102 to thin the metal lines, thereby increasing resistance and increasing the delay to ensure that the fastest path is always selected. In another example, HCI is used in a clock latch transistor to slow future transitions that bias the result in favor of a particular clock path for the latch cell 110. In another example, a multiplexer is stressed to make the multiplexer slower and make the multiplexer lose its edges such that a counter shows a lower value and the output of a comparator will always show a particular path for the ring oscillator based circuit 108.

As noted above, the aging may be repeated for each integrated circuit associated with each bit of the semiconductor chip. Thus, the PUF of the semiconductor chip is intentionally burned into the chip such that the natural output can be guaranteed and no helper data is required. This allows the PUF to be used for decryption without adding to memory overhead required by the methods that use helper data.

In addition, the novel methods of aging to burn in a PUF to the semiconductor chip may be extended to allow a user to store any value. For example, rather than burning in the natural output of each integrated circuit for the semiconductor chip, a user may desire to store an alternative value. The alternative value may be set using the aging process described herein to create a non-volatile memory.

Figure 3:
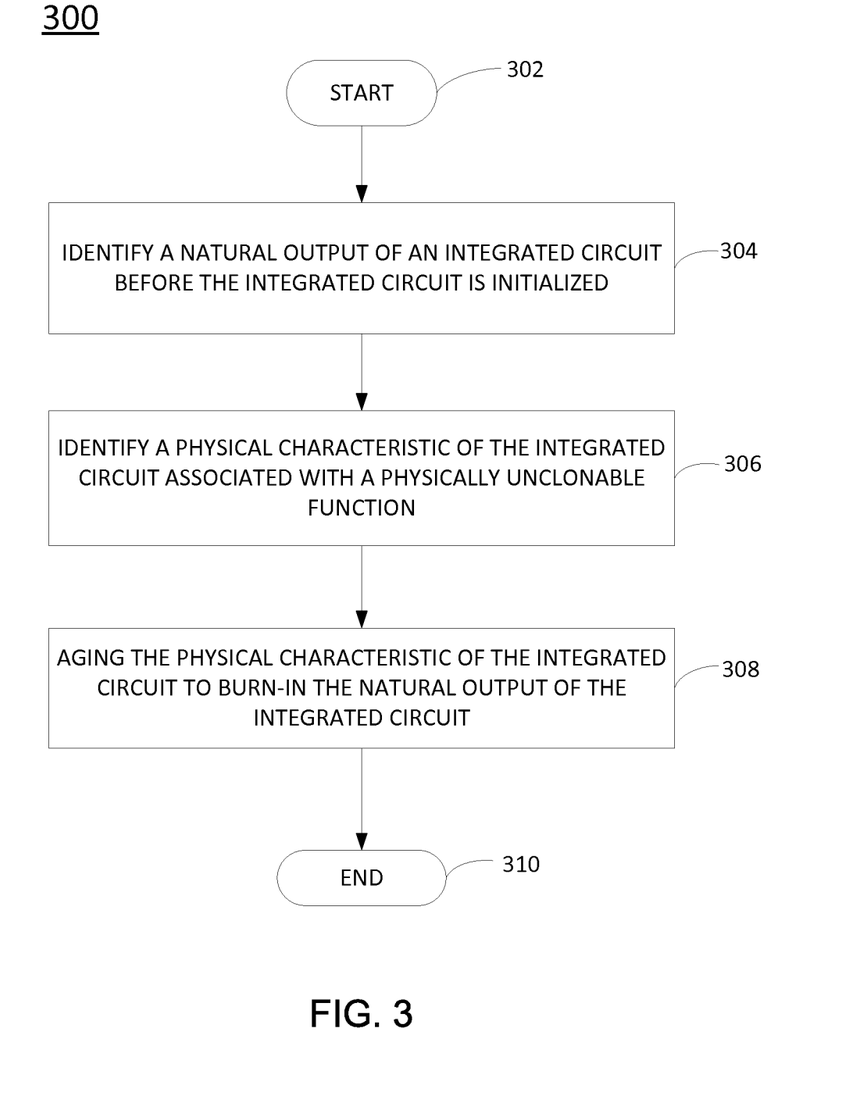
Figure 4:
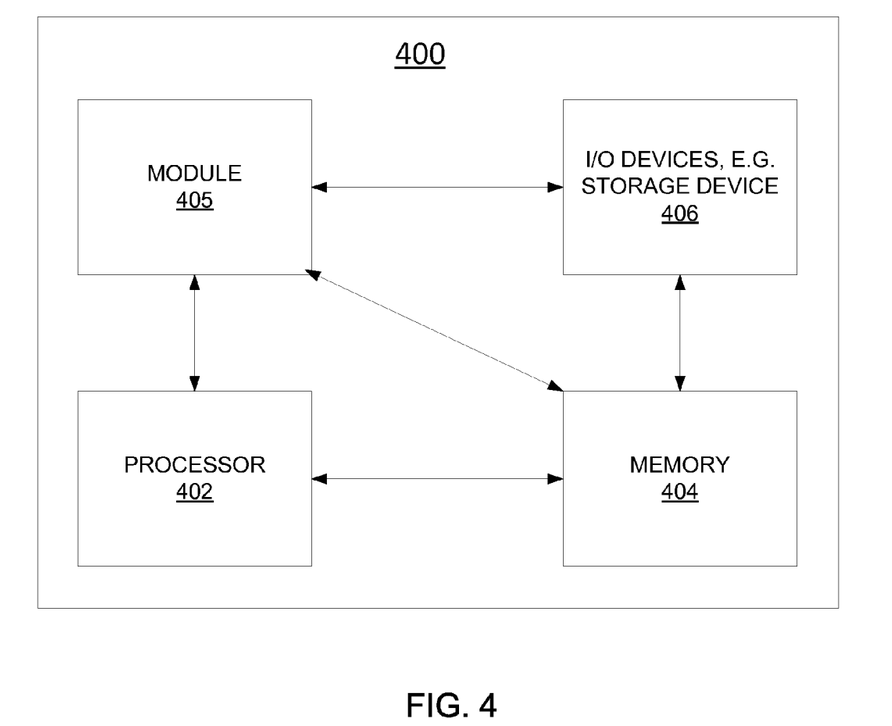
FIG. 4 illustrates a high-level block diagram of a general-purpose computer suitable for use in performing the functions described herein.

FIG. 3 illustrates a flowchart of a method 300 for performing physically unclonable function burn-in. In one example, the method 300 may be performed by a general purpose computer as illustrated in FIG. 4 and discussed below.

The method 300 begins at step 302. At step 304, the method 300 identifies a natural output of an integrated circuit before the integrated circuit is initialized. As noted above, when semiconductor chips are manufactured, the process variation created during the manufacturing creates a unique "fingerprint" for each semiconductor chip. This natural "fingerprint" may also be referred to as a physically unclonable function (PUF).

Before the semiconductor chip is initialized, each integrated circuit within the semiconductor chip has a natural output. Each integrated circuit within the semiconductor chip is read before it is initialized to identify what the natural output is. For example, each integrated circuit may be read to determine if it naturally stores a value of 1 or a value of 0.

At step 306, the method 300 identifies a physical characteristic of the integrated circuit associated with a PUF. For example, different types of integrated circuits may have different types of physical characteristics that can be exploited to ensure the natural output is constant. In other words, each integrated circuit has a different physical characteristic that contributes towards the PUF.

For example, an arbiter delay circuit has a physical characteristic of delay in each of the paths that may be exploited to age the integrated circuit. In another example, an SRAM has a physical characteristic of one or more transistors used to store a value that may be exploited to age the integrated circuit. In another example, a ring oscillator based circuit has a physical characteristic of a frequency that may be exploited to age the integrated circuit, and so forth.

At step 308, the method 300 ages the physical characteristic of the integrated circuit to burn-in the natural output of the integrated circuit. For example, if the integrated circuit has a particular "weak" physical characteristic that leads to producing the natural output, then the particular "weak" physical characteristic is further "weakened" to ensure that the integrated circuit always has the same natural output.

One example of aging is discussed above with respect to an SRAM in FIG. 2. For example, the physical characteristic of the SRAM may be the transistors and how they operate to arrive at the natural output value of 0. As illustrated in FIG. 2 and discussed above, various transistors within the SRAM are aged such that the threshold voltage of those transistors are increased to ensure that the integrated circuit does not flip to a value of 1 due to random variations or noise within the circuit or external signals.

Various aging effects may be applied to the physical characteristics of the integrated circuit to age the physical characteristic. Examples of these aging effects were discussed above.

The aging effect is applied for a time period sufficient to manipulate or emphasize the physical characteristic of the integrated circuit until the natural outcome is burned into the integrated circuit. For example, the aging effect may be applied to the integrated circuit for approximately one minute or more.

The amount of time that the aging effect is applied may be a function of environmental parameters, e.g., a voltage and/or a temperature. For example, the aging effect is accelerated if the voltage is increased or if the temperature is increased.

Once the integrated circuit is aged, the PUF is burned into the integrated circuit to ensure that the natural output does not change. The aging process may be extended to any integrated circuit to store any value (e.g., outputs other than the natural output). In other words, any semiconductor chip is transformed into a non-volatile memory by using the aging process to force the semiconductor chip to always store a desired value or output.

The method 300 (e.g., steps 304, 306 and 308) may be repeated for each integrated circuit associated with a bit in the semiconductor chip. For example, if the semiconductor chip is SRAM with 16 bits, the method 300 may be repeated for each one of the integrated circuits associated with each one of the 16 bits. Thus, the PUF will be burned in for the SRAM such that the natural output of each bit of the SRAM remains constant over a lifespan of the SRAM. The method 300 ends at step 310.

It should be noted that although not explicitly specified, one or more steps of the method 300 described above may include a storing, displaying and/or outputting step as required for a particular application. In other words, any data, records, fields, and/or intermediate results discussed in the methods can be stored, displayed, and/or outputted to another device as required for a particular application. Furthermore, steps or blocks in FIG. 3 that recite a determining operation, or involve a decision, do not necessarily require that both branches of the determining operation be practiced. In other words, one of the branches of the determining operation can be deemed as an optional step.

FIG. 4 depicts a high-level block diagram of a general-purpose computer suitable for use in performing the functions described herein. As depicted in FIG. 4, the system 400 comprises a hardware processor element 402 (e.g., a CPU), a memory 404, e.g., random access memory (RAM) and/or read only memory (ROM), a module 405 for performing physically unclonable function burn-in, and various input/output devices 406, e.g., storage devices, including but not limited to, a tape drive, a floppy drive, a hard disk drive or a compact disk drive, a receiver, a transmitter, a speaker, a display, a speech synthesizer, an output port, and a user input device (such as a keyboard, a keypad, a mouse, and the like).

Other forms of hardware processors may be used, such as for example, a state machine. In some examples, the processor may reside on the same semiconductor chip as the PUF. In some examples, the processor resides outside the semiconductor chip containing the PUF.

It should be noted that the present disclosure can be implemented in software and/or in a combination of software and hardware, e.g., using application specific integrated circuits (ASIC), a general purpose computer or any other hardware equivalents, e.g., computer readable instructions pertaining to the method(s) discussed above can be used to configure a hardware processor to perform the steps or operations of the above disclosed method. The present module or process 405 for performing physically unclonable function burn-in can be loaded into memory 404 and executed by hardware processor 402 to implement the functions as discussed above. As such, the exemplary methods (including associated data structures) of the present disclosure can be stored on a non-transitory (e.g., tangible or physical) computer readable storage medium, e.g., RAM memory, magnetic or optical drive or diskette and the like.

More specifically, the system 400 can be configured to perform or to control the various aging processes for effecting physically unclonable function burn-in of an integrated circuit. Thus, system 400 can be implemented with the necessary hardware and/or software to apply or to control any one or more of: the negative bias temperature instability process, the positive bias temperature instability process, the hot carrier injection process, or the electromigration process. The system 400 is also configured to determine the natural output of an integrated circuit before initialization and the burn-in output of the integrated circuit after aging.

While the foregoing describes exemplary embodiment(s) in accordance with one or more aspects of the present invention, other and further embodiment(s) in accordance with the one or more aspects of the present invention may be devised without departing from the scope thereof, which is determined by the claim(s) that follow and equivalents thereof. Claim(s) listing steps do not imply any order of the steps. Trademarks are the property of their respective owners.

What is claimed is:

1. A method for performing physically unclonable function burn-in, comprising:
   identifying, by a processor, a natural output of an integrated circuit before the integrated circuit is initialized;
   identifying, by the processor, a physical characteristic of the integrated circuit associated with the physically unclonable function; and
   aging, by the processor, the physical characteristic of the integrated circuit to burn-in the natural output of the integrated circuit.

2. The method of claim 1, wherein the aging comprises using at least one of: a negative bias temperature instability process, a positive bias temperature instability process, a hot carrier injection process, or an electromigration process.

3. The method of claim 1, wherein a time period required to complete the aging is a function of at least one of: a voltage or a temperature.

4. The method of claim 1, wherein the integrated circuit comprises at least one of: a static random-access memory, an arbiter delay circuit, a ring oscillator circuit, a latch cell, or a butterfly cell.

5. The method of claim 4, wherein:
   the integrated circuit comprises the static random-access memory; and
   the physical characteristic comprises one or more transistors used to store a value for the static random-access memory.

6. The method of claim 5, wherein the aging for the static random-access memory comprises:
   setting, by the processor, the stored value to be opposite of the natural output of the static random-access memory; and
   holding, by the processor, a position of one or more transistors of the static random-access memory to maintain the stored value to be opposite of the natural output for a time period.

7. The method of claim 4, wherein:
   the integrated circuit comprises the arbiter delay circuit; and
   the physical characteristic comprises a delay path for the arbiter delay circuit.

8. The method of claim 7, wherein the aging for the arbiter delay circuit comprises increasing, by the processor, a delay of a path that is deemed to be a slowest path.

9. The method of claim 4, wherein:
   the integrated circuit comprises the ring oscillator circuit; and
   the physical characteristic comprises a frequency for the ring oscillator circuit.

10. The method of claim 4, wherein:
    the integrated circuit comprises the static random-access memory; and
    the aging is repeated for each integrated circuit associated with each bit of the static random-access memory.

11. A non-transitory computer-readable medium storing a plurality of instructions that, when executed by a processor, cause the processor to perform operations for performing physically unclonable function burn-in, the operations comprising:
    identifying a natural output of an integrated circuit before the integrated circuit is initialized;
    identifying a physical characteristic of the integrated circuit associated with the physically unclonable function; and
    aging the physical characteristic of the integrated circuit to burn-in the natural output of the integrated circuit.

12. The non-transitory computer-readable medium of claim 11, wherein the aging comprises using at least one of: a negative bias temperature instability process, a positive bias temperature instability process, a hot carrier injection process, or an electromigration process.

13. The non-transitory computer-readable medium of claim 11, wherein a time period required to complete the aging is a function of at least one of: a voltage or a temperature.

14. The non-transitory computer-readable medium of claim 11, wherein the integrated circuit comprises at least one of: a static random-access memory, an arbiter delay circuit, a ring oscillator circuit, a latch cell, or a butterfly cell.

15. The non-transitory computer-readable medium of claim 14, wherein:
    the integrated circuit comprises the static random-access memory; and
    the physical characteristic comprises one or more transistors used to store a value for the static random-access memory.

16. The non-transitory computer-readable medium of claim 15, wherein the aging for the static random-access memory comprises:
    setting the stored value to be opposite of the natural output of the static random-access memory; and holding a position of one or more transistors of the static random-access memory to maintain the stored value to be opposite of the natural output for a time period.

17. The non-transitory computer-readable medium of claim 14, wherein:
the integrated circuit comprises the arbiter delay circuit; and
the physical characteristic comprises a delay path for the arbiter delay circuit.

18. The non-transitory computer-readable medium of claim 17, wherein the aging for the arbiter delay circuit comprises increasing a delay of a path that is deemed to be a slowest path.

19. The non-transitory computer-readable medium of claim 14, wherein:
the integrated circuit comprises the ring oscillator circuit; and
the physical characteristic comprises a frequency for the ring oscillator circuit.

20. An apparatus for performing physically unclonable function burn-in, comprising:
a processor; and
a computer-readable medium storing a plurality of instructions that, when executed by the processor, cause the processor to perform operations, the operations comprising:
identifying a natural output of an integrated circuit before the integrated circuit is initialized;
identifying a physical characteristic of the integrated circuit associated with the physically unclonable function; and
aging the physical characteristic of the integrated circuit to burn-in the natural output of the integrated circuit.

* * * * *